United States Patent [19]
Arai et al.

[11] Patent Number: 5,349,374
[45] Date of Patent: Sep. 20, 1994

[54] COLOR IMAGE FORMING DEVICE TO PREVENT COLOR SHIFTING

[75] Inventors: Kazuhiko Arai; Toru Teshigawara; Toshiaki Sagara, all of Kanagawa, Japan

[73] Assignee: Fuji Xerox Co., Ltd., Tokyo, Japan

[21] Appl. No.: 996,639

[22] Filed: Dec. 24, 1992

[30] Foreign Application Priority Data

Dec. 30, 1991 [JP] Japan ................................. 3-358387

[51] Int. Cl.$^5$ .............................................. H04N 1/21
[52] U.S. Cl. ................................................... 346/108
[58] Field of Search ................. 346/108, 1.1, 107 R, 346/76 L, 160; 358/296, 300, 302

[56] References Cited
U.S. PATENT DOCUMENTS 4,893,135  1/1990  Jamzadeh ............................ 346/108
4,903,067  2/1990  Murayama et al. ................. 346/160

*Primary Examiner*—Mark J. Reinhart
*Attorney, Agent, or Firm*—Finnegan, Henderson, Farabow, Garrett & Dunner

[57] ABSTRACT

Disclosed is a color image forming device in which latent images are formed by radiating a light beam onto a photoreceptor for each of colors, the latent images are developed to provide visible images, and a recording medium is transported to the visible images a plurality of times to form on the recording medium a color image consisting of a plurality of colors. The color image forming device includes a unit for detecting a reference transporting position of the recording medium to be moved to the photoreceptor, a unit for detecting a scan start signal of the light beam, a unit for measuring an error time from detection of the reference transporting position to detection of the scan start signal, and a unit for correcting a radiation timing of the light beam in accordance with the error time.

5 Claims, 8 Drawing Sheets

COLOR IMAGE FORMING DEVICE TO PREVENT COLOR SHIFTING

BACKGROUND OF THE INVENTION

1. Field of the Invention

The present invention relates to a color image forming device which scans light beams on a photoreceptor for a plurality of colors to thereby form electrostatic latent images, develops the thus formed electrostatic latent images in a plurality of color toners, and transfers the plurality of images to the same recording medium such as a sheet of recording paper to thereby form a color image and, in particular, to a color image forming device which is capable of restricting color positional deviation or color shifting between the transferred images on the recording medium.

2. Description of the Related Art

For a color image forming device which produces a color image by transferring a plurality of different color toner images on a sheet of recording paper superimposingly, there are conventionally known several transfer methods: for example, in one method, the electrostatic latent images of a manuscript image are formed by each of a plurality of colors on a drum-shaped or belt-shaped photoreceptor by use of light beams, the thus formed electrostatic latent images are developed in their respective color toners, and the toner images are transferred or sequentially superimposed on each other on a sheet of recording paper; or, in another method, a plurality of electrostatic latent images each having its own color different from others are formed in a plurality of photoreceptors respectively provided for respective colors, the electrostatic latent images are developed in their own colors, and the developed images are transferred or superimposed on each other on a sheet of recording paper.

In the above-mentioned types of conventional transfer methods, however, if the electrostatic latent images each having one of the plurality of colors are not superimposed on each other on the same sheet accurately, then the colors are caused to shift from each other in the resultant color image, failing to provide a color image of high quality.

In view of this, as a technique for superimposing the electrostatic latent images on each other in order to prevent such color shifting, there is employed a technique which detects the scanning start position of the light beams on the photoreceptors for forming the electrostatic latent images of the manuscript image and the transporting position of the sheet of recording paper, and then makes these positions coincide with each other at the transfer point.

FIG. 8 is an explanatory view of a light beam radiation block of a light beam radiation mechanism employed in a conventional color image forming device, and FIG. 9 is a timing chart of the light beam radiation in the conventional color image forming device shown in FIG. 8. In these figures, reference character SOS designates a light beam scan start signal on the photoreceptor, TR0 designates a detection signal occurring when a sheet of recording paper to be transported to a transfer position passes through a fixed reference position, and PS designates a write start signal for the electrostatic image. As shown in FIGS. 8 and 9, the write start signal PS is output in the following manner: that is, the SOS signal input after the paper reference position detection signal TR0 is generated is counted by a counter 50, and the write start signal PS is generated at a stage when the count value reaches a given value and is input to a laser driver 51, whereby an image signal is output from a laser 52.

Therefore, as shown in FIG. 9, the timing of generation of the paper reference position detection signal TR0 may vary every transfer due to shift in the timing of transporting the sheet of recording paper, which may in turn vary a time $t_e$ which is a period of time necessary from the generation of the detection signal TR0 to the start of counting of the SOS signal.

The variations of the time $t_e$ lead to the shifting of the write start position of the image in the sub-scanning direction thereof on the sheet of recording paper, resulting in the shifted colors in a color image to be formed.

SUMMARY OF THE INVENTION

The present invention aims at eliminating the drawbacks found in the above-mentioned conventional color image forming devices. Accordingly, it is an object of the invention to provide a color image forming device which can eliminate the color shift by correcting the error time $t_e$ from the generation of the paper reference position detection signal TR0 to the start of counting of the SOS signal.

In attaining the above object, the invention provides a color image forming device in which latent images are formed by radiating a light beam onto a photoreceptor for each of the plurality of colors, the latent images are developed to provide visible images, and a recording medium is transported to the visible images a plurality of times to thereby form a color image consisting of a plurality of colors on the recording medium, the color image forming device including: means for detecting a reference transporting position of the recording medium to be moved to the photoreceptor; means for detecting a scan start signal of the light beam; means for measuring an error time from detection of the reference transporting position to detection of the scan start signal; and means for correcting a radiation timing of the light beam in accordance with the error time.

Referring to such technical means, the color image forming device may be arranged such that it scans on the photoreceptor for a plurality of colors by use of light beams to thereby form electrostatic latent images, develops the thus formed electrostatic latent images in a plurality of color toners and transfers the plurality of images to the same recording medium. Also, the color image forming device may be arranged such that it forms on a plurality of photoreceptors a plurality of toner images each having its own color component which is different from others, and then transfers these toner images to the same recording medium.

Further, the recording medium usually points out a recording sheet to be positioned and held by a transfer member which is disposed opposite the photoreceptor and is rotatable in synchronization with the photoreceptor. However, the recording medium may actually include an intermediate transfer member which is disposed opposite the photoreceptor and is rotatable in synchronization with the photoreceptor.

In this case, as the reference transporting position detection means for the recording medium, there is employed means which is arranged such that it uses an optical sensor or the like to detect that a given portion of the transfer member (whether it is a drum-shaped or belt-shaped one) to position and hold the recording sheet or a given portion of the intermediate transfer member has passed a previously set reference point.

Further, referring to the radiation timing correcting means, it may be arranged such that it delays and corrects the detection timing of the reference transporting position of the recording medium according to the above-mentioned error time, or it may be adapted such that it corrects a time from detection of the above-mentioned scan start signal to radiation of the above-mentioned beam.

Moreover, the radiation timing correcting means may be arranged such that it is operable with respect to each of the color components, or it may be adapted such that it can selectively adjust a given developing color according to human sensitivities with respect to color shifting. For example, the above-mentioned correction is not made with respect to a yellow component which has only a little influence on the color shifting, but the light beam radiation timing corrections may be made with respect to the remaining developing color components than the yellow component by the radiation timing correcting means.

In addition, the amount of correction by the radiation timing correcting means may be determined linearly with respect to the error time or may be determined stepwise with respect to the error time. The latter method is advantageous in that the amount of correction can be determined quickly by a simple correction amount determining circuit.

DETAILED DESCRIPTION OF THE PREFERRED EMBODIMENTS

Description will be hereinbelow given in detail of the invention by way of embodiments respectively shown in the accompanying drawings.

Figure 1:
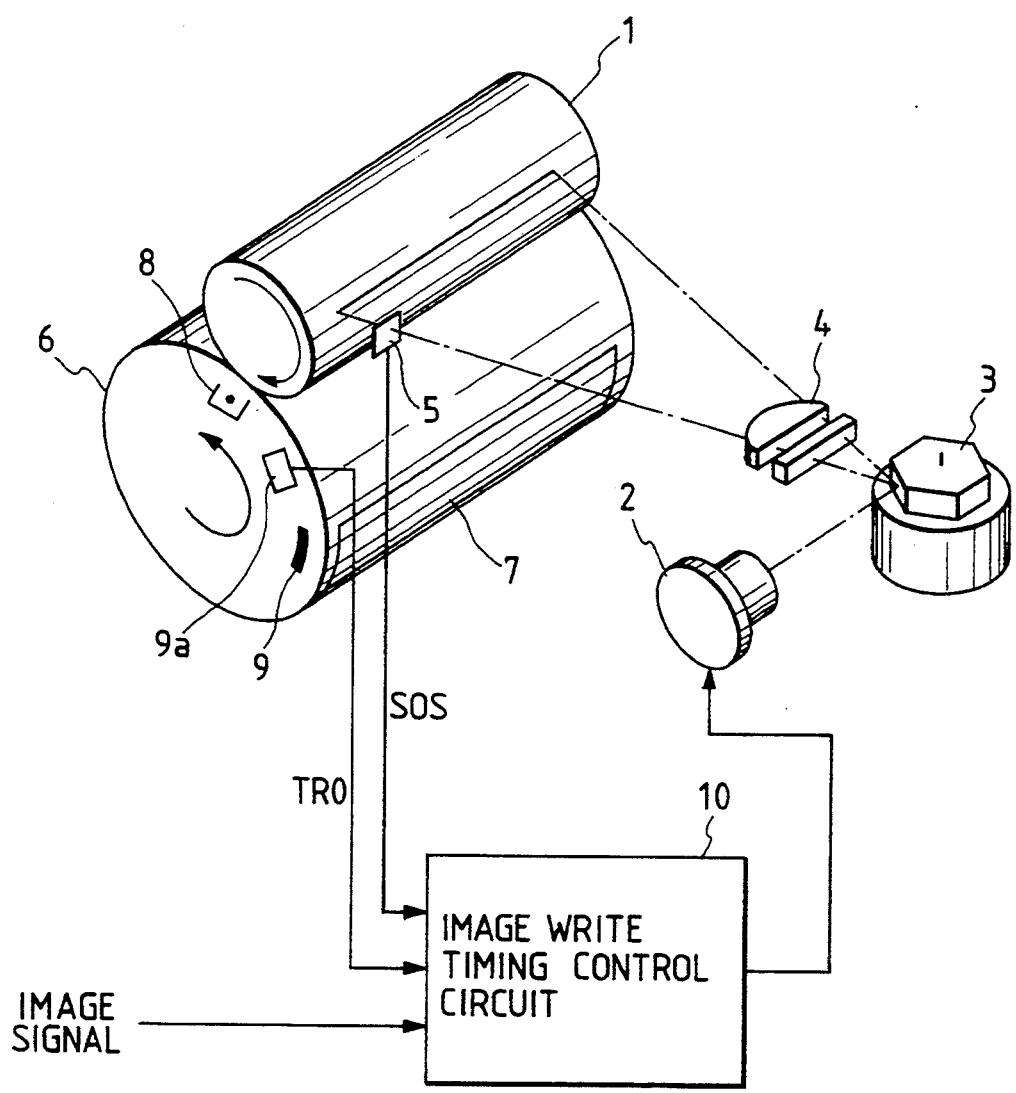
FIG. 1 is a schematic view showing an embodiment of a laser radiation part which incorporates therein a color image forming device according to the invention.

FIG. 1 shows a schematic view of the structure of an embodiment of a laser radiation part which incorporates therein a color image forming device according to the invention.

In FIG. 1, the surface of a photoreceptor 1 is electrically charged uniformly by a charging device (not shown), and the photoreceptor 1 is exposed by a laser beam emitted from a laser beam source 2, so that an electrostatic latent image for a recording image is formed according to the image information. The laser beam is allowed to scan on the photoreceptor 1 through a polygonal mirror 3 and an f-$\theta$ lens 4. At one end portion of the photoreceptor 1, provided is a photo sensor 5 which generates a scan start reference signal (scan start signal: SOS signal) responsive to the laser beam which is allowed to enter through each of the surfaces of the polygonal mirror 3.

Also, in the periphery of the photoreceptor 1, there are disposed developing devices (not shown) for the respective developing colors and a transfer drum 6, and the developed toner images are transferred at a transfer point to a sheet 7 of recording paper held by the transfer drum 6 by a transfer device 8. A reference position mark 9 is carved at the end portion of the transfer drum 6 and the passing time of the sheet 7 through the reference position can be detected by an output TR0 from a sensor 9a disposed at a given reference position of the moving locus of the mark 9. These outputs from the sensors, that is, the SOS signal and TR0 signal are input to an image write timing control circuit 10 and, at a timing with the error time $t_e$ corrected, an image signal similarly input to the image write timing control circuit 10 is radiated to the photoreceptor 1 as a modulated laser beam.

Figure 2:
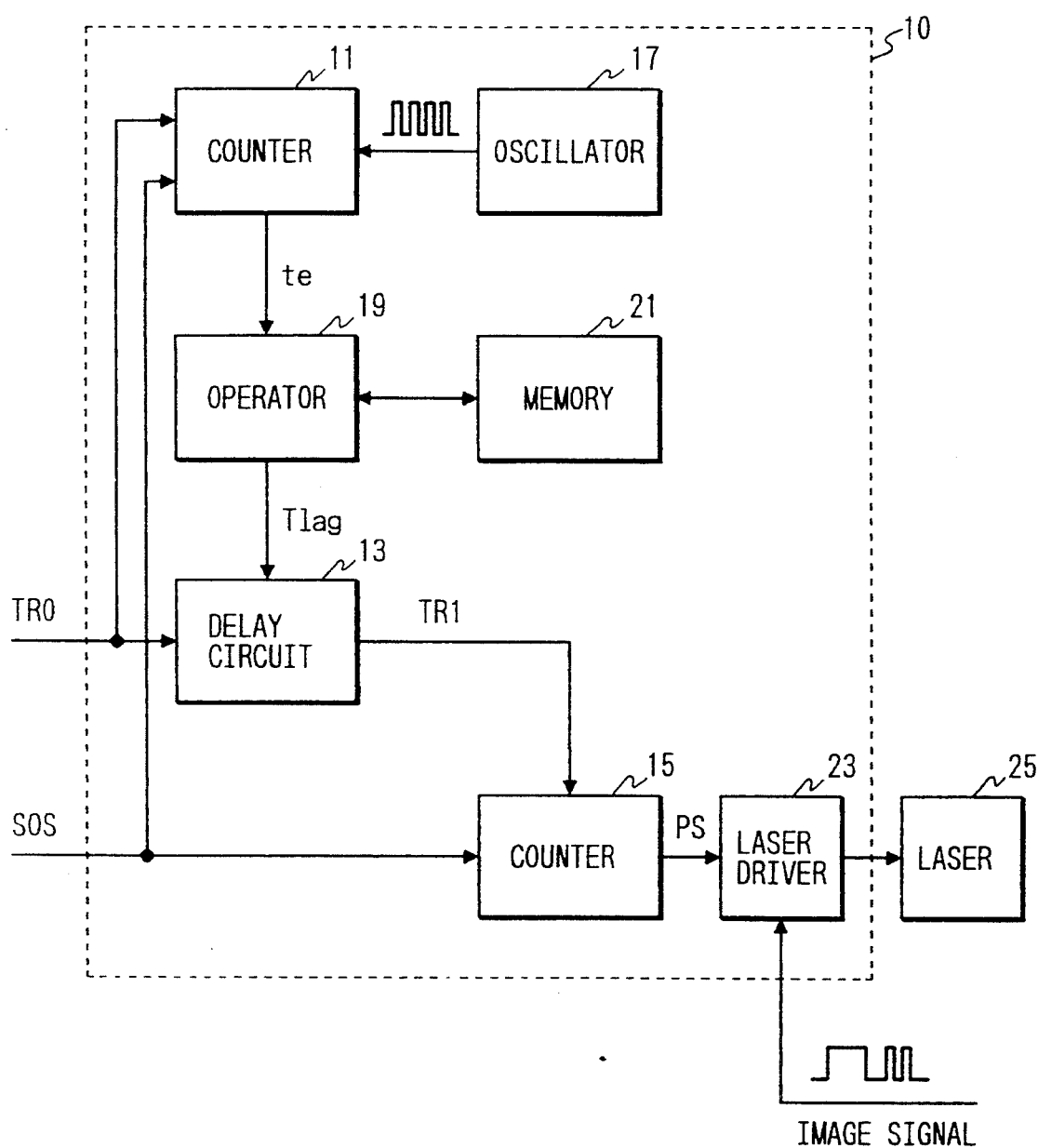
FIG. 2 is a block diagram showing the structure of an example of an image write timing control circuit employed in the color image forming device according to the above embodiment.
Figure 3:
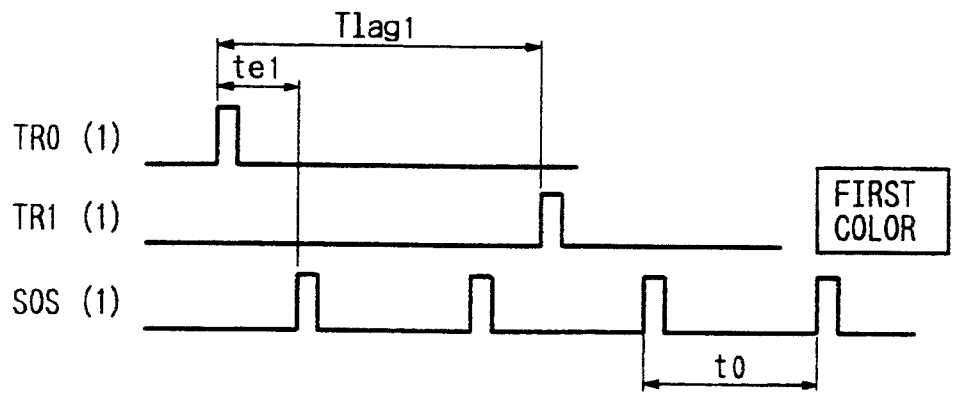
FIG. 3 is a timing chart showing the image write timings of the image write timing control circuit shown in FIG. 2.
Figure 3:
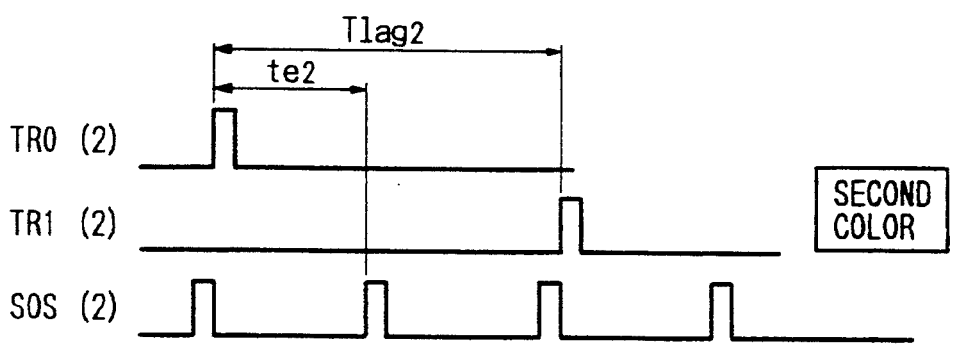
Figure 3:
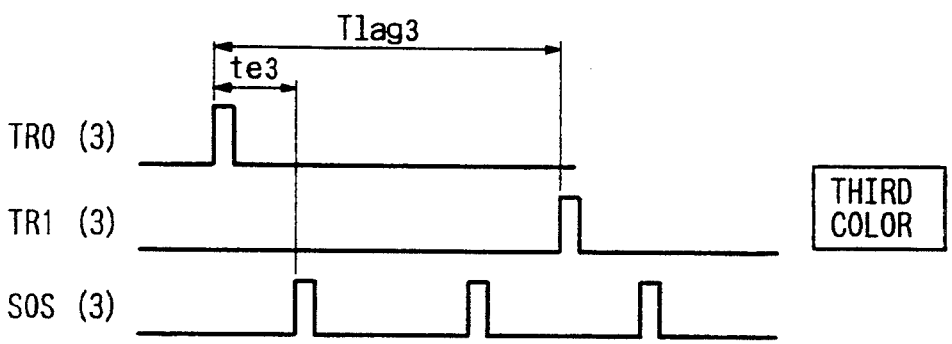
Figure 3:
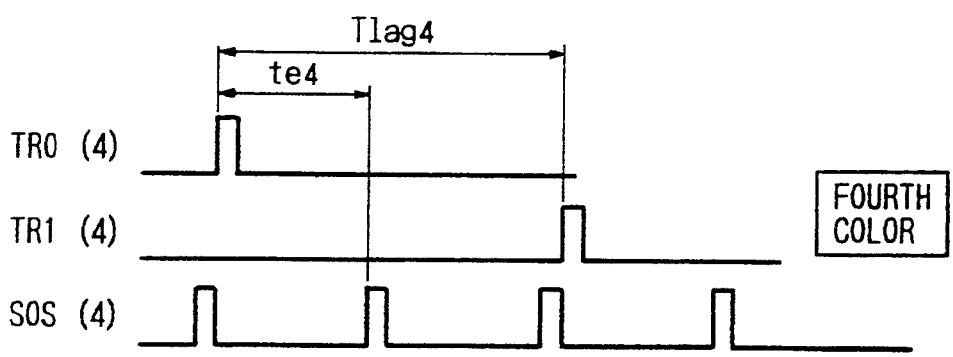

Now, FIG. 2 is a block diagram showing the structure of an example of the image write timing control circuit 10 employed in the color image forming device of the invention, and FIG. 3 is a timing chart showing image write timings employed in the image write timing control circuit shown in FIG. 2.

In FIG. 2, the TR0 signal is supplied to a counter 11 and a delay circuit 13, while the SOS signal is supplied to the counter 11 and a counter 15. The counter 11 has an oscillator 17 and counts a time period $t_e$ between the SOS and TR0 signals by means of the pulses from the oscillator 17. The value of the count is input to an operator 19, and the operator 19 operates a delay time $T_{lag}$ to be given to the TR0 signal according to the data and programs stored in a memory 21 provided with the operator 19. The delay time $T_{lag}$ is set in the counter of the delay circuit 13. The delay circuit 13 delays the TR0 signal input therein by the delay time $T_{lag}$ and, after the lapse of the time $T_{lag}$, a TR1 signal is supplied to the counter 15. At a time when a time (that is, $N_0$ in the pulse interval of the SOS signal) previously set in the pulse interval of the SOS signal has passed after the TR1 signal was received, the counter 15 supplies an image write signal PS to a laser driver 23. Responsive to this, the driver 23 modulates the image signal into a laser beam and drives a laser 25.

FIG. 3 shows the delay time $T_{lag}$ to be operated by the operator 19 in accordance with the time $t_e$ that is measured at the first color and the operation algorithm thereof will be explained below by use of Table 1.

TABLE 1

| First Color | Second Color | Third Color | Fourth Color |
|---|---|---|---|
| $T_{lag}=2t_0$ | When $-t_0 \leq t_{e1}-t_{e2} \leq -(\frac{1}{4})t_0$, then $T_{lag}=2t_0-t_0$ | When $t_{e1}-t_{e3} \geq t_{e3}-t_{e2}$, then $T_{lag}=2t_0$ When $t_{e1}-t_{e3} < t_{e3}-t_{e2}$, then $T_{lag}=2t_0-t_0$ | As mentioned below, $T_{lag}=2t_0$ |
| | When $|t_{e1}-t_{e2}| \leq (\frac{1}{4})t_0$, then $T_{lag}=2t_0$ | When $|t_{e1}-t_{e3}| \leq (\frac{1}{4})t_0$ and $|t_{e2}-t_{e3}| \leq (\frac{1}{4})t_0$, then $T_{lag}=2t_0$ When not $|t_{e1}-t_{e3}| \leq (\frac{1}{4})t_0$ and $|t_{e2}-t_{e3}| \leq (\frac{1}{4})t_0$, but $t_{e1}-t_{e3} \geq t_{e3}-t_{e2}$, then $T_{lag}=2t_0+t_0$ When not $|t_{e1}-t_{e3}| \leq (\frac{1}{4})t_0$ and $|t_{e2}-t_{e3}| \leq (\frac{1}{4})t_0$, but $t_{e1}-t_{e3} < t_{e3}-t_{e2}$, then $T_{lag}=2t_0-t_0$ | In accordance with size relation between $t_{e1}-t_{e4}$, $t_{e2}-t_{e4}$ and $t_{e3}-t_{e4}$ and size relation between either of them and $(\frac{3}{4})t_0$, $T_{lag}=2t_0$ |
| | When $(\frac{1}{4})t_0 < t_{e1}-t_{e2} \leq t_0$, then $T_{lag}=2t_0+t_0$ | When $t_{e1}-t_{e3} \geq t_{e3}-t_{e2}$, then $T_{lag}=2t_0+t_0$ When $t_{e1}-t_{e3} < t_{e3}-t_{e2}$, then $T_{lag}=2t_0$ | As mentioned above, $T_{lag}=2t_0$ |
| — | Max. Shift Amount Between Two Colors $\leq (\frac{1}{4})t_0$ | Max. Shift Amount Between Three Colors $\leq (\frac{1}{2})t_0$ | Max. Shift Amount Between Four Colors $\leq (\frac{3}{8})t_0$ |

Times necessary from detection of transfer drum reference positions at the first and second colors to the nearest SOS signals are expressed as $t_{e1}$ and $t_{e2}$ respectively, and times necessary from detection of the transfer drum reference positions at the first and second colors to writing of the images are expressed as $t_{s1}$ and $t_{s2}$ respectively. Also, delay times at the first and second colors are expressed as $T_{lag\,1}$ and $T_{lag\,2}$ respectively. The pulse interval of the SOS signal is expressed as $t_0$.

Now, when the error time is delayed but not corrected, then the following can be obtained;

$$t_{s1} = t_{e1} + N_0 \times t_0$$

$$t_{s2} = t_{e2} + N_0 \times t_0$$

Further, a color shift time between the first and second colors can be expressed in the following manner;

$$|t_{s1}-t_{s2}| = |t_{e1}-t_{e2}|$$

Here, $|t_{e1}-t_{e2}| \leq t_0$ that is, the color shift time, at the maximum thereof, is smaller than $t_0$. If the velocity of the photoreceptor is expressed as $V_{pr}$, then the color shift of the image, at the maximum thereof, is equal to $t_0 \times V_{pr}$.

Therefore, it is assumed that $T_{lag}=2t_0$, and the delay time is increased or decreased as a unit of $|t_0|$ according to the value of the error time $t_e$. This gives the maximum color shift time T in the following expression: that is, $T \leq (\frac{1}{4})t_0$.

Referring to the increase and decrease method, $t_0$ is subtracted with respect to an advance of $(t_{e1}-t_{e2})$ and $t_0$ is added with respect to a delay of $(t_{e1}-t_{e2})$. However, when the advance or delay time of $(t_{e1}-t_{e2})$ is small, if $t_0$ is added or subtracted, then the error is increased and, for this reason, in such case, the addition or subtraction of $t_0$ is not conducted. The boundary conditions for execution of the addition or subtraction of $t_0$ are as shown in Table 1.

Thanks to the above increase and decrease method, the shift of the image in the sub-scan direction thereof can be restricted to $(\frac{1}{4})t_0$ or less.

Figure 4:
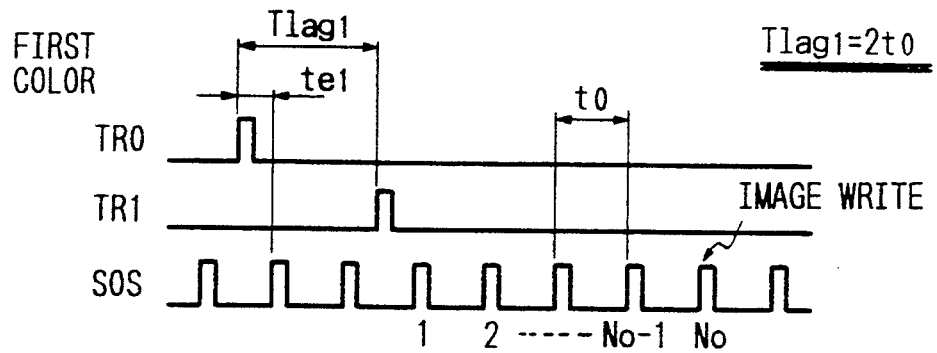
FIG. 4 is a timing chart showing the color shift correction conditions in the first embodiment of the invention.
Figure 4:
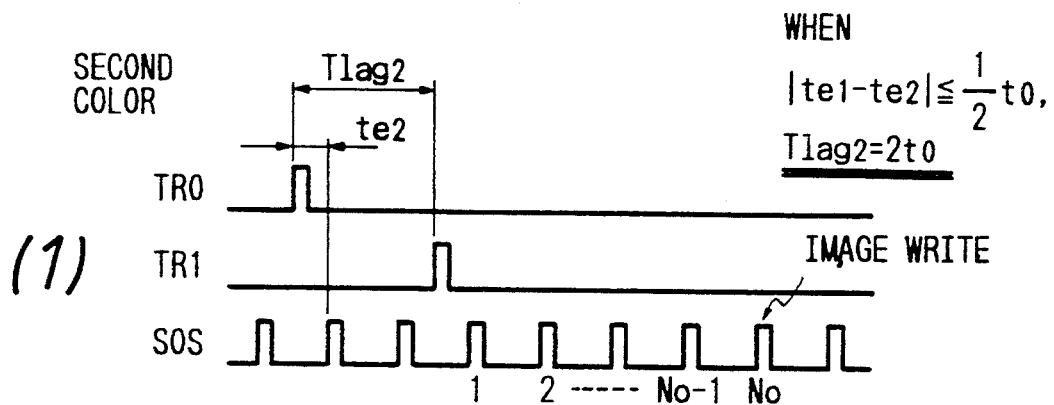
Figure 4:
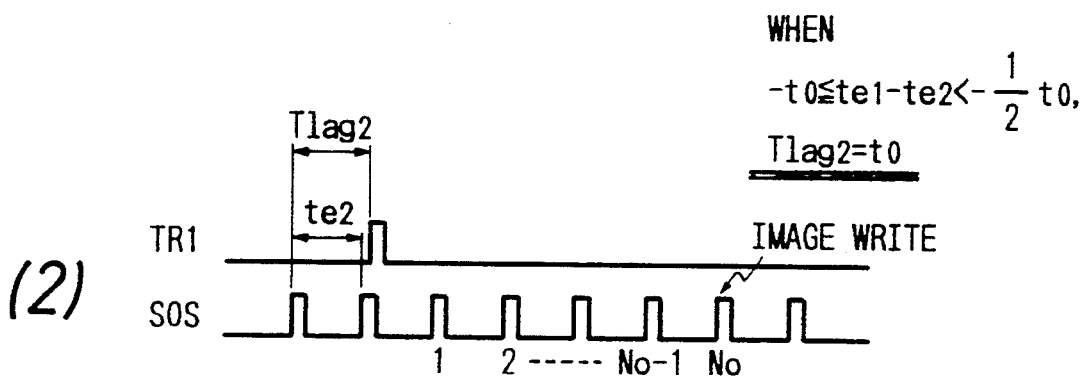
Figure 4:
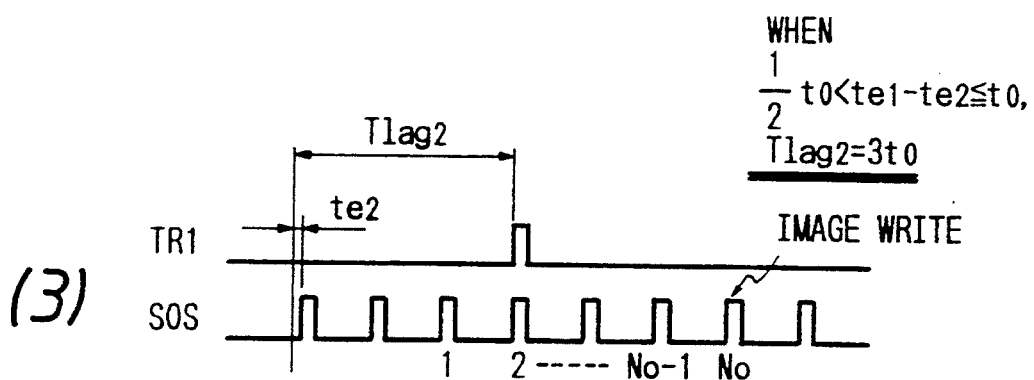

In FIG. 4, there is shown a condition in which the color shift between the first and second colors is corrected.

Further, the present invention can apply not only to the restriction of the color shift between the two colors but also to the restriction of the color shift between three or four colors. As shown in Table 1, if times necessary from detection of the transfer member reference position signal TR0 to detection of the scan start signal SOS at the first, second, third, and fourth colors are expressed as $t_{e1}$, $t_{e2}$, $t_{e3}$ and $t_{e4}$ respectively, then a delay time $T_{lag}$ at the third color can be determined in accordance with a size relation between $t_{e1}-t_{e3}$ and $t_{e2}-t_{e3}$ (that is, which is larger, $t_{e1}-t_{e3}$ or $t_{e2}-t_{e3}$) and a size relation between either of them and $(\frac{3}{4})t_0$, so that the maximum amount of shift between the three colors can be restricted to $(\frac{3}{8})t_0$ or less.

Also, a delay time $T_{lag}$ at the fourth color can be determined in accordance with a size relation between $t_{e1}-t_{e4}$, $t_{e2}-t_{e4}$ and $t_{e3}-t_{e4}$ and a size relation between either of them and $(162)t_0$, so that the maximum amount of shift between the four colors can be restricted to $(\frac{5}{8})t_0$ or less.

Figure 5:
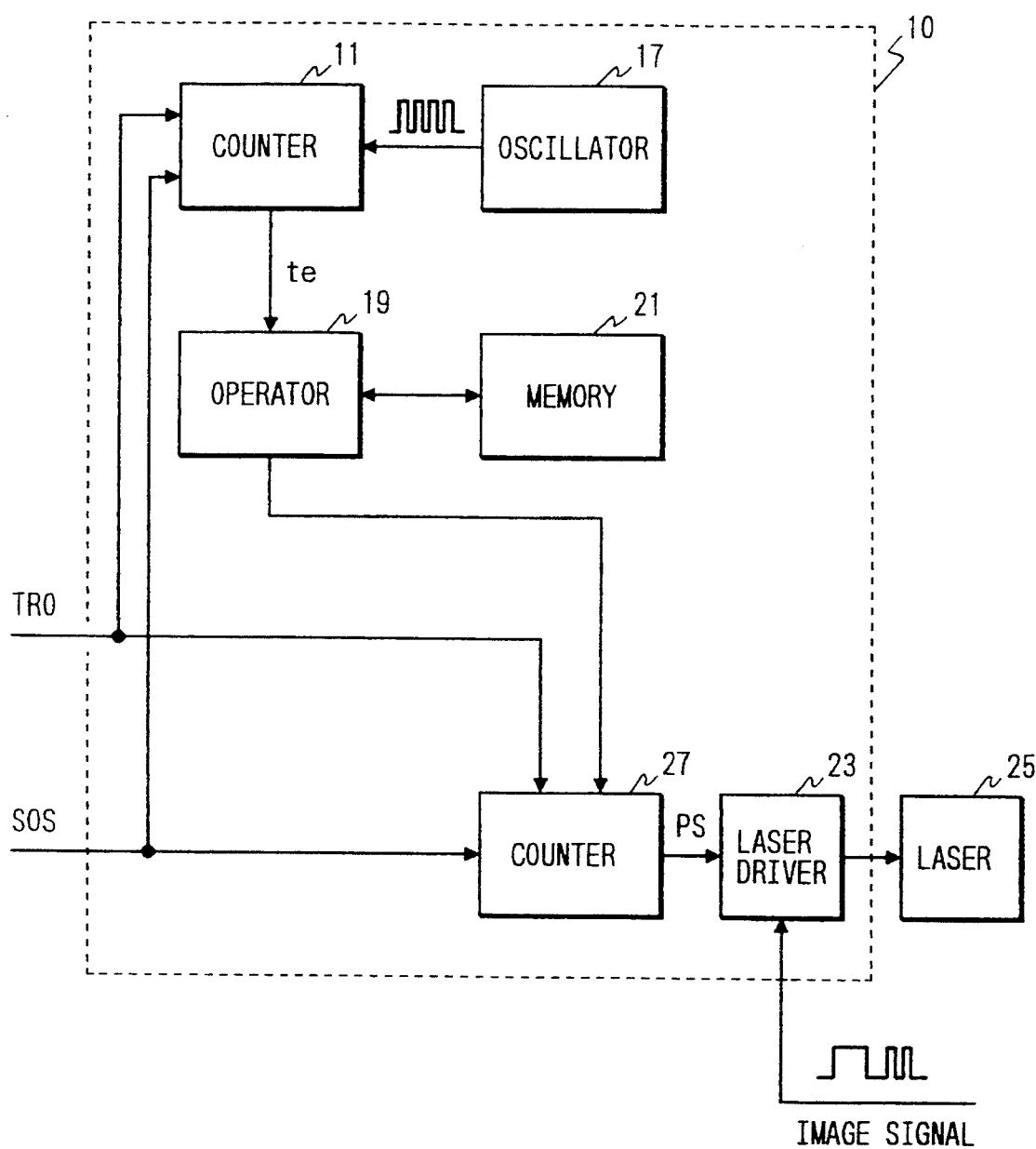
FIG. 5 is a block diagram showing the structure of a second embodiment of the image write timing control circuit employed in the color image forming device according to the invention.
Figure 6:
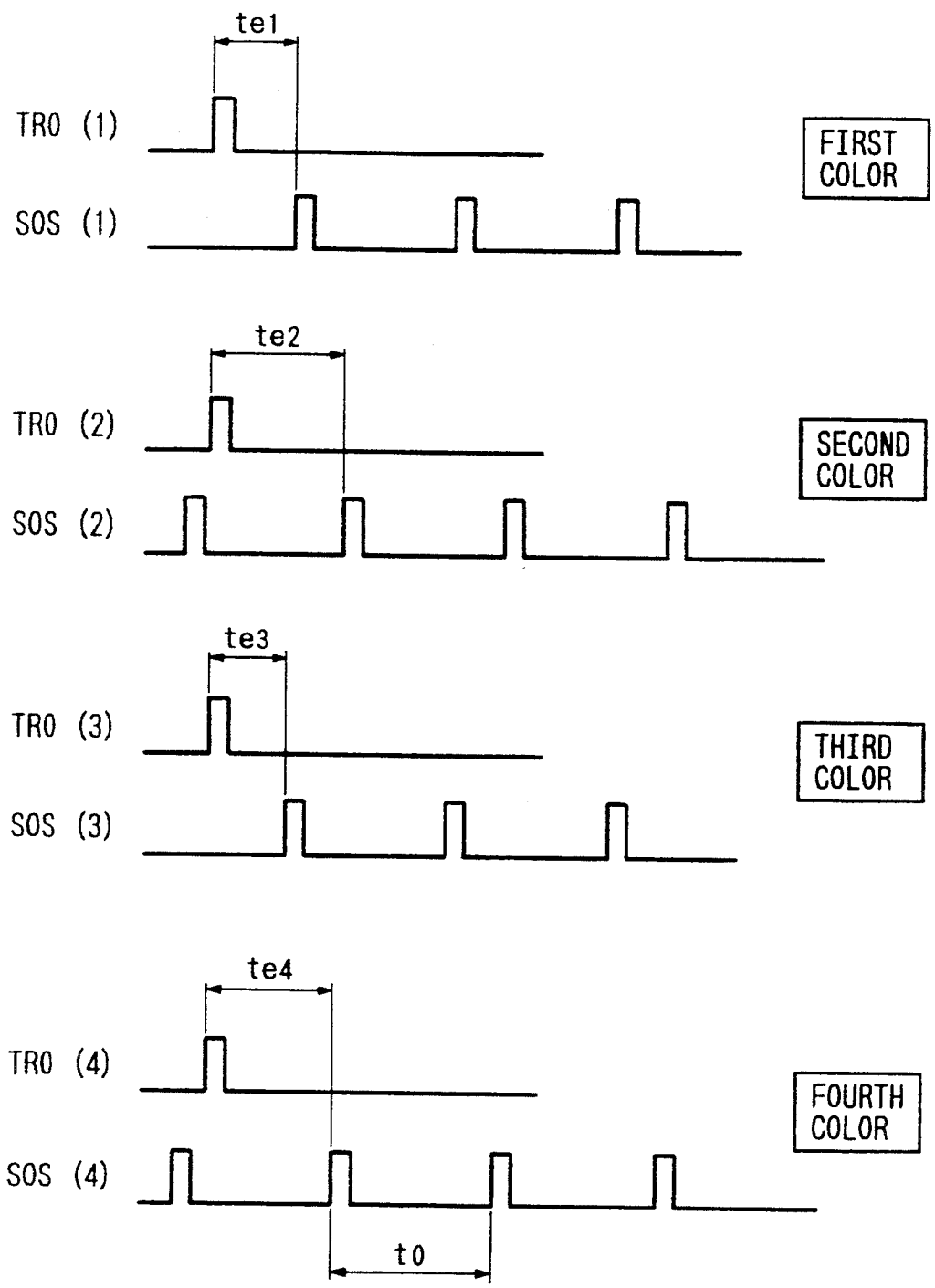
FIG. 6 is a timing chart showing the image write timings of the image write timing control circuit shown in FIG. 5.

FIG. 5 shows a block diagram of the structure of another embodiment of the image write timing control circuit employed in the color image forming device according to the invention, and FIG. 6 shows a timing chart of image write timings employed in the image write timing control circuit shown in FIG. 5. In FIG. 5, the same parts or elements as those shown in FIG. 2 are given with the same designations and the description thereof is omitted here.

A TR0 signal is supplied to a counter 27 and counter 11 and an SOS signal is also supplied to the counter 27 and counter 11. The counter 11 has an oscillator 17 and uses the pulses from the oscillator 17 to count a time $t_e$ between the SOS signal and the TR0 signal. The count value of the counter 11 is input to an operator 19 and, in accordance with the date and programs stored in a memory 21 provided with the operator 19, a correction value N of a radiation start timing to be set in the counter 27 is operated. The correction value N is then set in the counter 27. The counter 27 delays the TR0 signal by a time corresponding to the correction value N set in the pulse interval of the SOS signal after receiving the TR0 signal, to thereby output an image write signal PS to a laser driver 23. Responsive to this, the laser driver 23 modulates an image signal and drives a laser 25.

FIG. 6 illustrates a relation between the radiation start timings to be set in the counter 27 according to the time period $t_e$ measured at the first color, and the operation algorithm thereof will be explained below by use of Table 2.

TABLE 2

| First Color | Second Color | Third Color | Fourth Color |
|---|---|---|---|
| $N=N_0$ | When $-t_0 \leq t_{e1}-t_{e2} \leq -(\frac{1}{2})t_0$, then $N=N_0-1$ | When $t_{e1}-t_{e3} \geq t_{e3}-t_{e2}$, then $N=N_0$ When $t_{e1}-t_{e3} < t_{e3}-t_{e2}$, then $N=N_0-1$ | As mentioned below, $N=N_0$, $N=N_0+1$ or $N=N_0-1$ |
|  | When $|t_{e1}-t_{e2}| \leq (\frac{1}{2})t_0$, then $N=N_0$ | When $|t_{e1}-t_{e3}| \leq (\frac{1}{3})t_0$, and $|t_{e2}-t_{e3}| \leq (\frac{1}{3})t_0$, then $N=N_0$ When not $|t_{e1}-t_{e3}| \leq (\frac{1}{3})t_0$ and $|t_{e2}-t_{e3}| \leq (\frac{1}{3})t_0$, but $t_{e1}-t_{e3} \geq t_{e3}-t_{e2}$, then $N=N_0+1$ When not $|t_{e1}-t_{e3}| \leq (\frac{1}{3})t_0$ and $|t_{e2}-t_{e3}| \leq (\frac{1}{3})t_0$, but $t_{e1}-t_{e3} < t_{e3}-t_{e2}$, then $N=N_0-1$ | In accordance with size relation between $t_{e1}-t_{e4}$, $t_{e2}-t_{e4}$ and $t_{e3}-t_{e4}$ and size relation between either of them and $(\frac{3}{8})t_0$, $N=N_0$, $N=N_0+1$ or $N=N_0-1$ |
|  | When $(\frac{1}{2})t_0 < t_{e1}-t_{e2} \leq t_0$, then $N=N_0+1$ | When $t_{e1}-t_{e3} \geq t_{e3}-t_{e2}$, then $N=N_0+1$ When $t_{e1}-t_{e3} < t_{e3}-t_{e2}$, then $N=N_0$ | As mentioned above, $N=N_0$, $N=N_0+1$ or $N=N_0-1$ |
| — | Max. Shift Amount Between Two Colors $\leq (\frac{1}{2})t_0$ | Max. Shift Amount Between Three Colors $\leq (\frac{2}{3})t_0$ | Max. Shift Amount Between Four Colors $\leq (\frac{3}{8})t_0$ |

As described before, the color shift time, at the maximum value thereof, is smaller than $t_0$. Therefore, the radiation start timing is increased or decreased in the pulse interval of the SOS signal according to the value of the error time $t_e$. As a result of this, the maximum color shift time T can be obtained as follows: $T \leq (\frac{1}{2})t_0$.

In the present increase or decrease method, 1 is subtracted from N with respect to an advance of $(t_{e1}-t_{e2})$ and 1 is added with respect to a delay of N. However, where the time of advance or delay of N is small, the increase or decrease of 1 results in the increased errors and, therefore, the increase or decrease of 1 is not executed. The boundary conditions for execution of increase or decrease of 1 with respect to N are as shown in Table 2.

Figure 7:
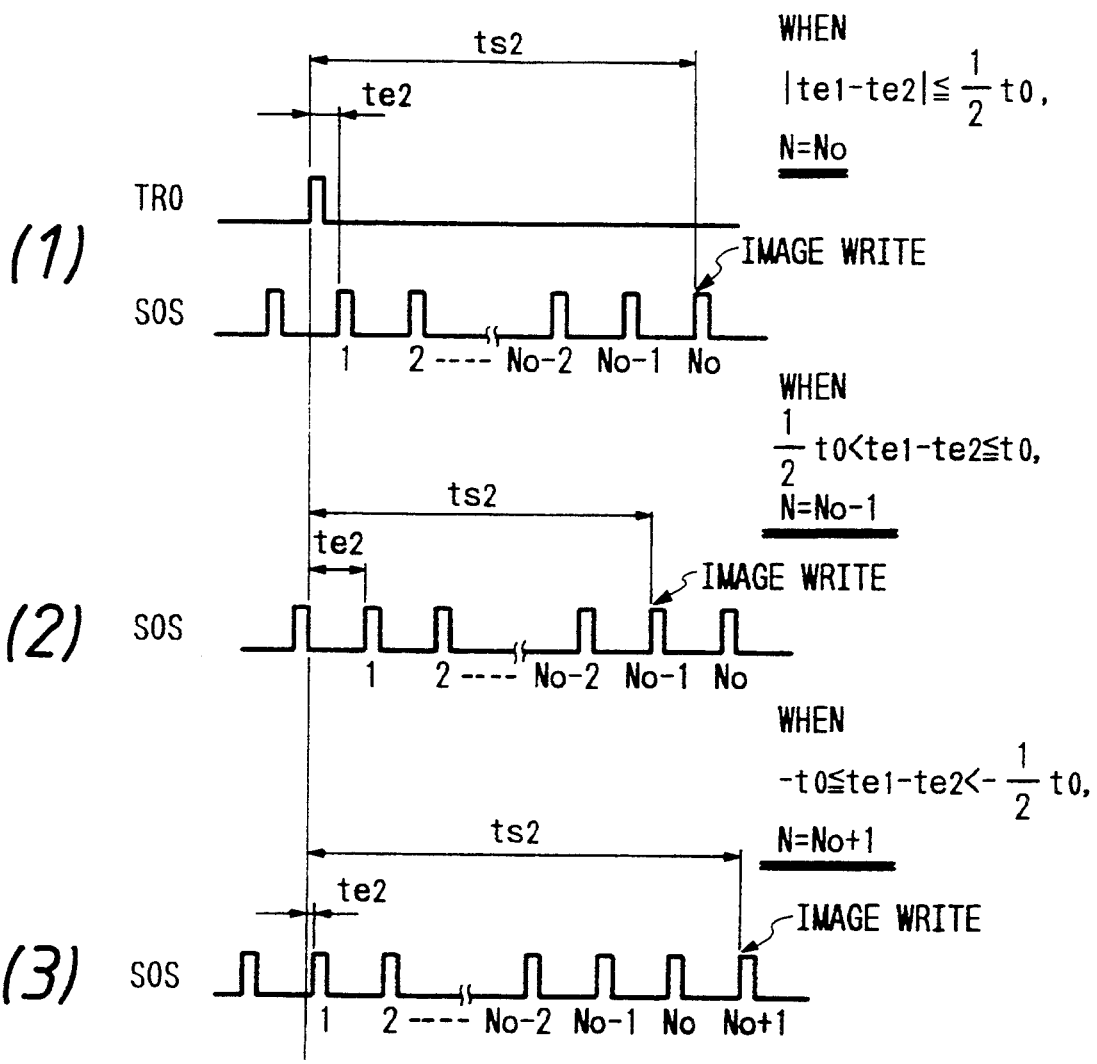
FIG. 7 is a timing chart showing the color shift correction conditions in the second embodiment of the invention.
Figure 8:
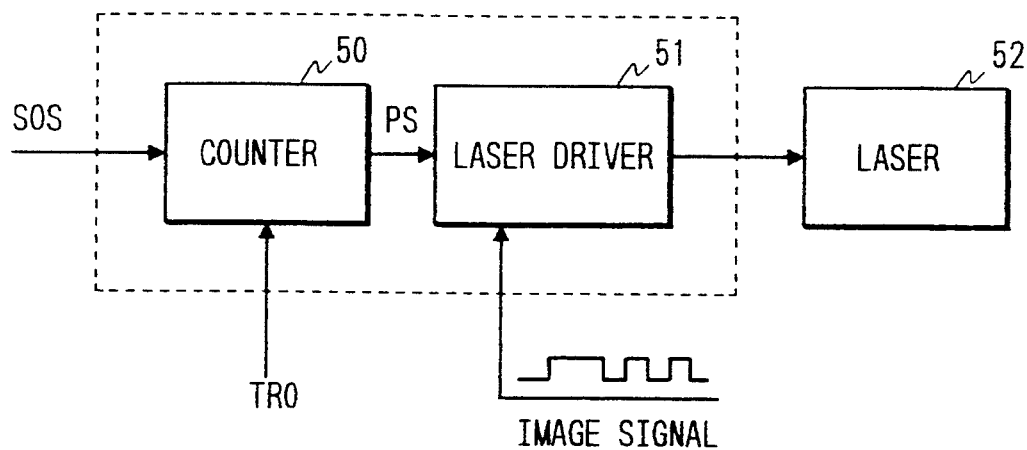
FIG. 8 is an explanatory view showing a light beam radiation block of a light beam radiation mechanism employed in a conventional color image forming device.
Figure 9:
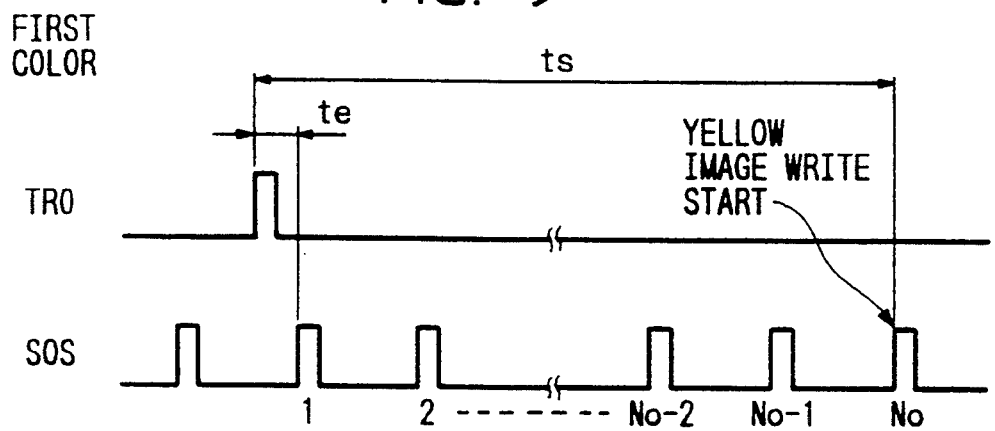
FIG. 9 is a timing chart showing the light radiation timings of the light beam radiation mechanism employed in the conventional color image forming device.
Figure 9:
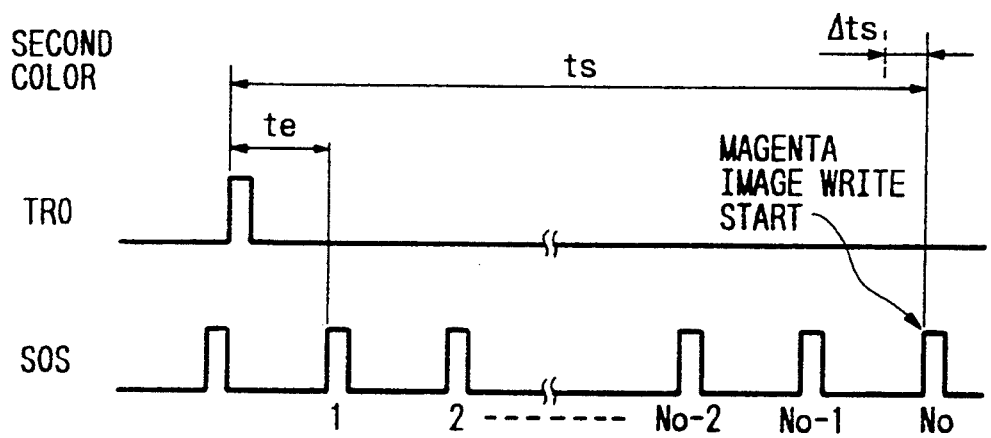

Thanks to this, the color shift of the image in the sub-scan direction can be restricted to $(\frac{1}{2})t_0$ or less. Conditions for correcting the color shift between the first and second colors are shown in FIG. 7.

Further, the present invention can apply not only to the restriction of the color shift between two colors but also to the restriction of the color shift between three or four colors. As shown in Table 2, if times necessary from detection of the transfer member reference position signal TR0 to detection of the scan start signal SOS at the first, second, third and fourth colors are expressed as $t_{e1}$, $t_{e2}$, $t_{e3}$ and $t_{e4}$ respectively, then the number of counts of the scan start signals SOS until writing of the image is started after detection of the signal TR0 at the third color can be determined in accordance with a size relation between $t_{e1}-t_{e3}$ and $t_{e2}-t_{e3}$ and a size relation between either of them and $(\frac{2}{3})t_0$, so that the maximum amount of shift between the three colors can be restricted to $(\frac{2}{3})t_0$ or less.

Also, the number of counts N until writing of the image is started after detection of the signal TR0 at the fourth color can be determined in accordance with a size relation between $t_{e1}-t_{e4}$, $t_{e2}-t_{e4}$ and $t_{e3}-t_{e4}$ and a size relation between either of them and $(\frac{3}{8})t_0$, so that the maximum amount of shift between the four colors can be restricted to $(\frac{3}{8})t_0$ or less.

As has been described heretofore, according to the invention, when forming of latent images by radiating a light beam onto a photoreceptor is executed for each of colors, these latent images are developed to provide visible images, and a recording medium is transported to the visible images a plurality of times to thereby form on the recording medium a color image consisting of a plurality of colors, a light beam radiation timing for each color with respect to the recording medium to be moved to the photoreceptor can be adjusted to match to a reference timing to be created by a control device, so that there can be realized a color image forming free from color shift.

Also, due to the fact that the adjustment of the light beam write timing is signal-processed to thereby prevent position shift between the respective color latent images, the timing adjustment of the invention is improved in response when compared with the write timing adjustment of a type that requires an actuator in a beam radiation device itself or in a recording medium transporting mechanism itself. Therefore, according to the invention, the timing adjustment can be made with no delay even with respect to the higher transporting speed of the recording medium.

Further, the invention has an advantage that the reference position of the recording medium to be moved to the photoreceptor is free from limits, and also has another advantage that the accuracy of the write timing is not lowered with respect to the timing variations of the reference position detecting means.

What is claimed is:

1. A color image forming device in which latent images are formed by radiating a light beam onto a photoreceptor for each of a plurality of colors, the latent images are developed to provide visible images, and a recording medium is transported to the visible images a plurality of times to thereby form a color image consisting of a plurality of colors on the recording medium, said color image forming device comprising:

means for detecting a reference transporting position of the recording medium to be moved to the photoreceptor;

means for detecting a scan start signal of the light beam;

means for measuring an error time from detection of the reference transporting position to detection of the scan start signal; and means for correcting a radiation timing of the light beam in accordance with the error time.

2. The color image forming device as set forth in claim 1, wherein said correcting means delays and corrects a detection timing of said reference transporting position in accordance with said error time.

3. The color image forming device as set forth in claim 1, wherein said correcting means corrects a time from detection of said scan start signal to radiation of said light beam.

4. The color image forming device as set forth in claim 1, wherein said correcting means corrects said radiation timing for at least one of said colors for latent images.

5. The color image forming device as set forth in claim 1, wherein said recording medium includes an intermediate transfer member.

* * * * *